No. 682,633. Patented Sept. 17, 1901.
W. F. MASTERS.
TIRE FOR VEHICLE WHEELS.
(Application filed Feb. 20, 1901.)
(No Model.)
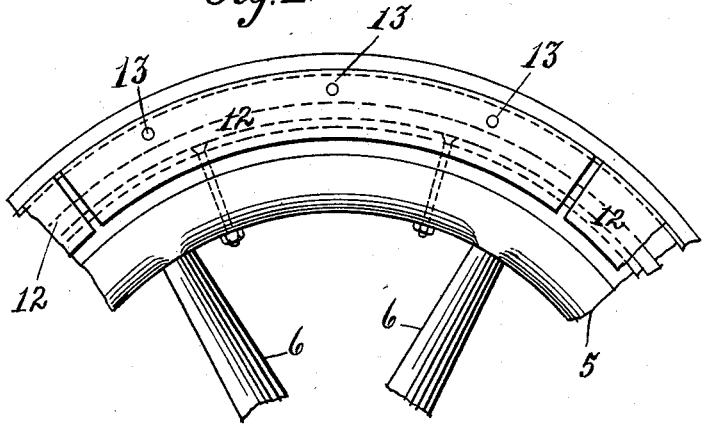
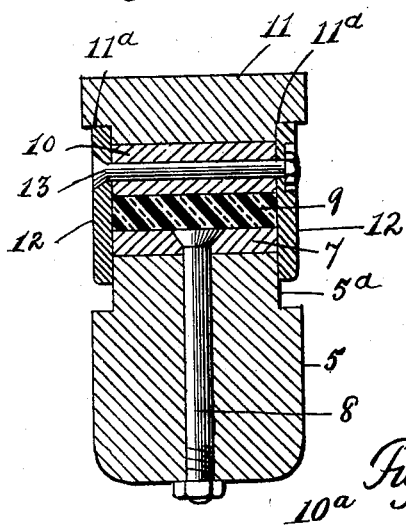
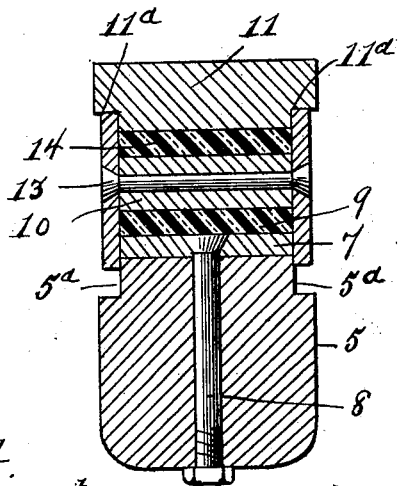
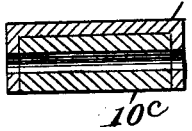
WITNESSES:
INVENTOR
Wm. F. Masters
BY
ATTORNEYS

UNITED STATES PATENT OFFICE.

WILLIAM F. MASTERS, OF BROOKLYN, NEW YORK.

TIRE FOR VEHICLE-WHEELS.

SPECIFICATION forming part of Letters Patent No. 682,633, dated September 17, 1901.

Application filed February 20, 1901. Serial No. 48,096. (No model.)

*To all whom it may concern:*

Be it known that I, WILLIAM F. MASTERS, a citizen of the United States, residing at Brooklyn, in the county of Kings and State of New York, have invented certain new and useful Improvements in Tires for Vehicle-Wheels, of which the following is a full and complete specification, such as will enable those skilled in the art to which it appertains to make and use the same.

This invention relates to tires for vehicles; and the object thereof is to provide an improved tire which is particularly adapted for use in connection with heavy vehicles, such as express-wagons, trucks, and other vehicles designed for heavy loads, but which may also be used in connection with lighter vehicles, if desired.

The invention is an improvement on that described and claimed in United States Letters Patent granted to me November 20, 1900, No. 622,008, and is fully disclosed in the following specification, of which the accompanying drawings form a part, in which the separate parts of my improvement are designated by the same reference characters in each of the views, and in which—

Figure 1 is a side view of a portion of the wheel of a vehicle provided with my improved tire; Fig. 2, a transverse section thereof; Fig. 3, a view similar to Fig. 2, showing a modification; and Fig. 4, a modification of a detail of the construction.

In the drawings forming a part of this specification I have shown at 5 a part of the rim of the wheel of a vehicle, which in practice is composed of separate fellies, which make up said rim and with which in practice the spokes 6 are connected, and said rim is provided at its opposite sides with an annular groove $5^a$, and around the rim 5 is placed a steel band 7, which is bolted to the rim 5, as shown at 8, and this steel band 7 serves to securely bind the rim and spokes together in the manner of an ordinary tire.

Around the steel band 7 is placed a rubber band 9, and around the rubber band 9 is placed a band 10 of wood, which is preferably thicker than the steel and rubber bands 7 and 9, and around the band 10 of wood is placed a thick steel band 11, which constitutes a tire proper.

The outer steel band 11 is made comparatively thick and is provided at its inner perimeter and at its opposite sides with an annular groove $11^a$, similar to the grooves $5^a$ in the rim 5, and the steel band 11, the band 10 of wood, the rubber band 9, and the inner steel band 7 make up a composite tire, the separate members of which are bound together by annular metal plates 12, which are preferably composed of separate sections, as shown in Fig. 1, and said metal plates are held in place by bolts 13, which are passed therethrough and through the wooden band 10.

It will be observed that the wooden band 10, the rubber band 9, and the steel band 7 are of less width in transverse section than the body of the rim 5, and the body of the outer steel band 11 and the metal plates 9 fit in the annular grooves $5^a$ and $11^a$, formed in the rim 5 and in the outer steel band 11.

In the normal position of the composite tire there is an annular space between the inner edges of the plates 12 and the body portion of the rim 5, which permits the movement of the tire when the vehicle is heavily loaded, said movement being occasioned by the compression of the rubber band 9, and by means of this construction I provide a tire which possesses great elasticity and at the same time great durability and by means of which the vehicle is prevented from jolting and jarring when heavily loaded, which is also an injury thereto, and the wheels themselves are made very durable, as are also the separate parts of the vehicle.

In Fig. 3 I have shown a modification in which a supplemental rubber band 14 is placed between the main outer steel band 11 and the band 10 of wood, and this construction is employed where greater elasticity is desired. It will be observed that the metal side plates 12 are substantially flush with the sides of the rim 5, and the outer steel band 11, which constitutes the tire proper, is preferably slightly wider and extends beyond the metal plates 12, the object of this construction being to give the tire a wider tread and also to give the wheel greater stability and strength.

The thickness of the separate bands of steel, rubber, wood, and steel may be regulated as desired, this thickness depending to an extent upon the character of the vehicle to which the tire is applied.

In the case of extremely heavy vehicles instead of making the band 10 within the outer steel tire entirely of wood I may also make it of metal and wood, as shown in Fig. 4, in which I employ a ring or band $10^a$, composed of metal and wood, the metal constituting an outer casing $10^b$, having side flanges or rims within which is placed a band $10^c$, of wood, and in practice the metal side plates are secured in place by bolts passed through the wooden ring or band and the side flanges of the metal casing.

Having fully described my invention, what I claim as new, and desire to secure by Letters Patent, is—

1. A wheel provided with the usual rim, the sides of which are provided at the perimeter thereof with annular grooves, and a tire consisting of an inner band of steel, a band of rubber, a band of wood, and an outer band of steel provided at its inner edges with annular grooves and metal side plates bolted to said band of wood and inclosing the inner band of steel, the band of rubber, and the band of wood, substantially as shown and described.

2. A wheel, the rim of which is provided at its perimeter with annular side grooves, and a tire consisting of an inner band of steel, a band of rubber, a band of wood, another band of rubber, and an outer band of steel, the last-named band being provided with annular side grooves at its inner perimeter and side plates bolted to the band of wood and inclosing the inner band of steel and the bands of rubber and wood, substantially as shown and described.

In testimony that I claim the foregoing as my invention I have signed my name, in presence of the subscribing witnesses, this 18th day of February, 1901.

WILLIAM F. MASTERS.

Witnesses:
F. A. STEWART,
F. TELLER.